Jan. 13, 1970  K. MASSOUDA ET AL  3,488,837
METHOD OF MAKING HOLLOW CYLINDRICAL MOLDED ARMATURES
Original Filed Nov. 12, 1964  4 Sheets-Sheet 2

INVENTORS
KHADR MASSOUDA
CARL E. SPAEDER
BY
THEIR ATTORNEY

Jan. 13, 1970     K. MASSOUDA ET AL     3,488,837
METHOD OF MAKING HOLLOW CYLINDRICAL MOLDED ARMATURES
Original Filed Nov. 12, 1964     4 Sheets-Sheet 4

INVENTORS
KHADR MASSOUDA
CARL E. SPAEDER
BY
THEIR ATTORNEY

United States Patent Office 3,488,837
Patented Jan. 13, 1970

3,488,837
METHOD OF MAKING HOLLOW CYLINDRICAL MOLDED ARMATURES
Khadr Massouda, Toronto, Ontario, Canada, and Carl E. Spaeder, Erie, Pa., assignors to General Electric Company, a corporation of New York
Original application Nov. 12, 1964, Ser. No. 410,520. Divided and this application Feb. 27, 1967, Ser. No. 642,611
Int. Cl. H02k *15/02*
U.S. Cl. 29—598                                 4 Claims

ABSTRACT OF THE DISCLOSURE

A method of making hollow, cylindrical molded armatures wherein conductor lengths are formed into coils each having free ends, an overlapping end turn and spaced-apart sides which lie in the same circular arc. A number of such preformed coils are arranged circumferentially about the outside surface of a collapsible cylindrical fixture member having a commutator assembly removably attached thereto to form a drum-type winding wherein the coil sides are in side-by-side relationship on a common radius determined by the outside diameter of the fixture member. The free ends of each of the coils are connected to appropriate segments of the commutator assembly and the winding encapsulated and bonded at one end to the commutator assembly with a thermosetting resinous composition which is cured to provide a rigid, homogeneous mass of hardened resin having the winding contained therein. The fixture member is then collapsed and removed from the encapsulated winding structure and the commutator assembly to provide a hollow cylindrical molded winding structure having the commutator assembly intimately bonded and electrically connected thereto and having an inside diameter determined by the outside diameter of the fixture member.

---

This invention relates to shell-type armatures and more particularly to methods of making such armatures. This application is a division of copending application Ser. No. 410,520 filed Nov. 12, 1964, and now abandoned.

Prior art investigators have reported on the theoretical possibility of achieving weight reduction and improved dynamic performance characteristics from moving conductor direct current motors by constructing such motors with hollow cylindrical or so-called "shell-type" armatures so that none of the magnetic material need to rotated. For example, theoretical investigations of this type have been reported by G. C. Newton, Jr. and R. W. Rasche in an article entitled, "Can Electric Actuators Meet Missile Requirements" AIEE transactions—Part II Applications and Industry, Vol. 80 (1961), pages 306–312, and by A. A. S. Danthine and P. L. R. Pirotte in IEEE Conference Paper No. CP63–142 (1963) "Design of Shell-Type D–C Motors for Minimum Weight."

While, theoretically, a shell-type direct current machine may be provided by merely arranging to revolve a hollow cylindrical armature between spaced-apart stator members, which define an air gap and provide an interlinking magnetic flux, the construction of a practical shell armature presents many problems. For example, in conventional laminated core construction, slots are provided which locate and contain the armature coils both during and after winding. Moreover, such a core provides a convenient and practical mechanical means of coupling the armature winding to the shaft. In a shell-type direct current machine, however, it is desirable that the armature shell be as thin as possible, so as not to require too large an air gap, yet contain an adequate winding to produce a desired motor torque or generated voltage. Ideally, therefore, no core whatever should be employed. Thus, the armature must be hollow as well as self-supporting, lightweight and sufficiently strong mechanically to allow for coupling the winding to the shaft for rotation therewith. Further, the hollow armature structure must be capable of withstanding not only torsional and centrifugal forces but also the thermal, vibratory and other forces encountered during machine operation.

Attempts have been made in the prior art to meet these criteria by winding the armature coils about a hollow form of nonconducting material. While this approach has been utilized to produce small machines (fractional horsepower motors for example) it has not been entirely satisfactory for use in the construction of the larger integral horsepower machines. Thus, such an approach has not been satisfactory when attempting to make a machine of the highest horsepower for a given size and weight and which exhibits the desired improved dynamic performance characteristics as well. For example, in order to obtain a sufficient number of armature coils on such a hollow winding form to provide a machine of acceptable size, a relatively large air gap must be provided requiring a large machine excitation which contributes to both the size and the weight of the machine.

It is an object of this invention, therefore, to provide an armature of the shell-type which substantially achieves the foregoing desiderata.

It is another object of this invention to provide a shell-type armature capable of withstanding high torsional and centrifugal forces while requiring a minimum machine air gap.

It is a further object of this invention to provide a method of making thin hollow cylindrical armatures capable of withstanding large torsional and centrifugal forces.

Briefly stated, in accordance with one aspect of this invention, we provide a method of making a hollow, cylindrical molded armature. In carrying out this method conductors are provided with a number of similarly directed off-sets intermediate the ends so that when formed into armature coils of generally loop form in the usual manner the two spaced-apart coil side portions will lie in the same circular arc. A plurality of such preformed armature coils is then arranged substantially uniformly about the outside contour of a cylindrical fixture member, the outside diameter of which corresponds to the desired inside diameter of the armature, to form a drum-type armature winding having overlapping end portions but with all coil side portions disposed in side-by-side relationship and on a common radius, determined by the outside diameter of the cylindrical fixture member about which the coils are distributed. The winding so formed about the cylindrical member is encapsulated with an electrically insulating, thermosetting resinous material filling all spaces and forming a rigid, homogeneous mass of hardened resin containing the winding therein and having a predetermined inside and outside contour. After such encapsulation, the cylindrical fixture member is removed from the structure. To reinforce the resin encapsulated winding structure against the effects of torsional and centrifugal forces, the structure is provided with at least one annular band over the coil side portions thereof by wrapping with a material composed of non-conductive fibers concentrically arranged in successive layers and adapted to be bonded into a rigid, dense homogeneous mass by a hardened resin. It will be understood that this annular reinforcing band may be applied either before or after encapsulation of the winding and may be arranged randomly, concentrically or helically as desired.

As used throughout the specification and in the appended claims, the terms "coil side" and "coil side portions" are used to designate that portion of an armature coil which lies within the air gap region of the machine. In this respect, therefore, the terms are used in their conventionally accepted sense wherein all active conductors, or "inductors" of a coil which lie in a single slot, taken as a group, are termed a "coil side."

The novel features believed characteristic of this invention are set forth with particularly in the appended claims. The invention itself, however, both as to its organization and method of operation, as well as further objects and advantages thereof may best be understood by reference to the following description taken in conjunction with the accompanying drawings in which:

FIGURE 4 is a very greatly enlarged sectional view of the circled portion designated at A in FIGURE 1;

Figure 1:
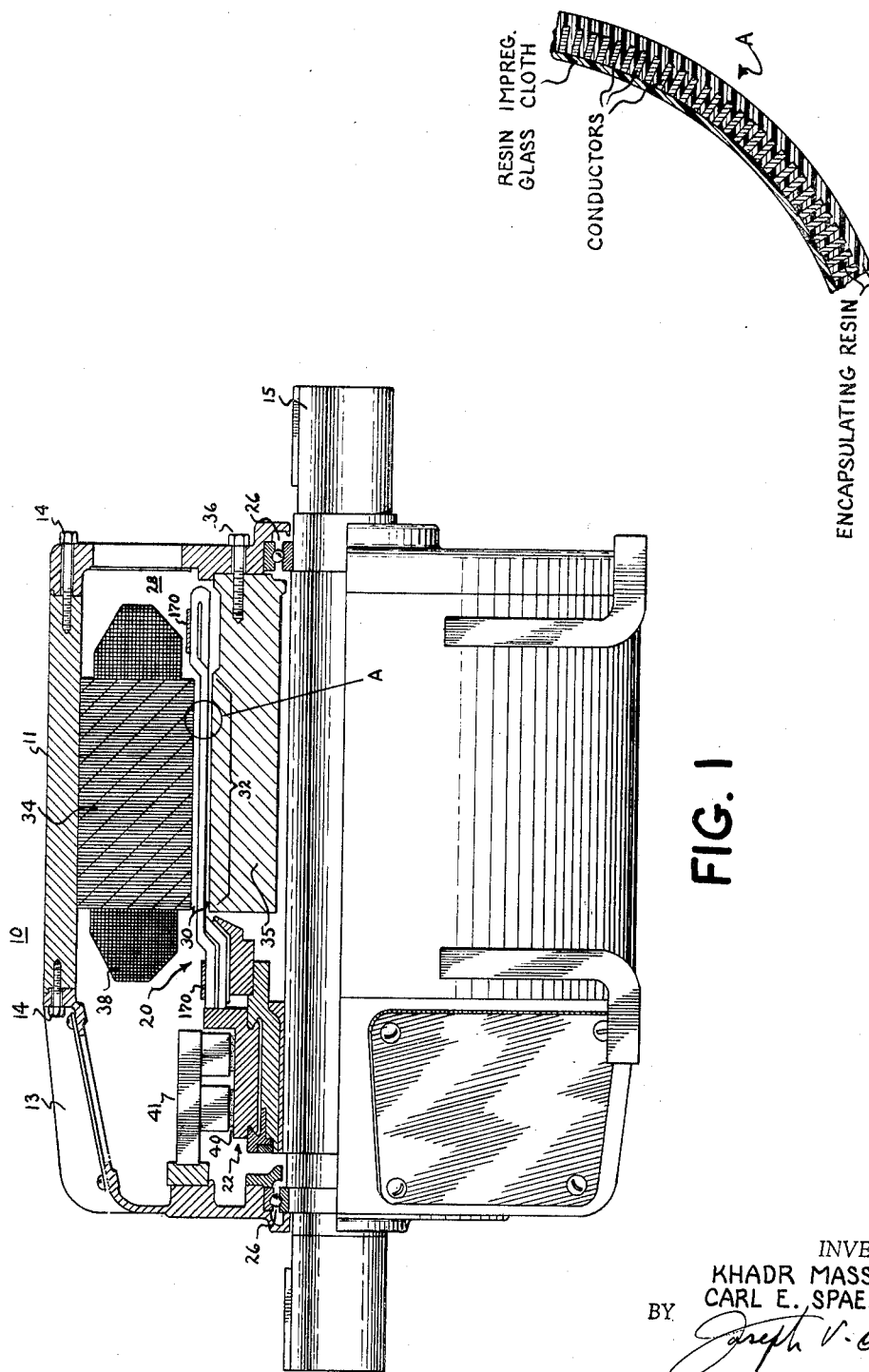
FIGURE 1 is a longitudinal partial sectional view of a shell-type direct current dynamoelectric machine incorporating the novel shall armature of this invention.

Referring now to the drawing, there is illustrated in FIGURE 1 a direct current dynamoelectric machine 10, which may be a motor or a generator. As shown, machine 10 comprises an annular frame 11 having end bells 12 and 13 suitably secured thereto such as by a plurality of bolts 14. A shaft 15, carrying a shell-type armature 20, including a commutator 22 and a hollow cylindrical inductor shell containing an armature winding, is rotatably supported in end bells 12 and 13 by suitable bearings, shown as the anti-friction bearings 26.

Coacting with armature 20 is a stator assembly, designated generally at 28, which defines an air gap 30, and also provides an interlinking magnetic flux. The "active" or coil side portions 32 of the armature winding extend within the air gap 30. Stator assembly 28 includes a number of main field poles, one of which is shown at 34, which are arranged within frame 11 in any suitable manner well known to the art, and a stationary core member 35 which may be conveniently supported from end bell 12 by a plurality of bolts 36 so as to be in coaxial relationship with shaft 15 and armature 20. The interlinking magnetic flux may be provided in well-known manner by excitation of main field poles 34 by appropriate electrical or permanent magnet members. Conveniently, and as shown particularly in FIGURE 1, such excitation is provided by coils 38 disposed on each of the main field poles and arranged to provide the desired field winding. Brushes 40, riding on commutator 22 and supported from end bell 13 by brush rigging 41 of any suitable type, complete the general construction of the machine.

The particular form and construction of machine 10 is a matter that is within the discretion of the designer, however, the general design is in accordance with accepted principles of dynamoelectric machine construction with respect to the provisions of sufficient machine excitation and proper alignment of stator and armature members, for example. Further, the wire size and air gap should be selected to obtain the maximum output from the machine with a reasonable no-load eddy-current loss in the armature conductors.

As described, the shell-type direct current machine 10 may be viewed as comprising a hollow armature revolving between a stationary field and a stationary core. In accordance with this invention we provide a hollow armature for such a machine which has a novel construction thereby contributing to a machine having many desirable features among which are the following:

(1) Low inertia
(2) Fast response
(3) Low inductance
(4) Essentially no torque ripple
(5) Improved commutation without commutating poles
(6) High peak torque.

Figure 2:
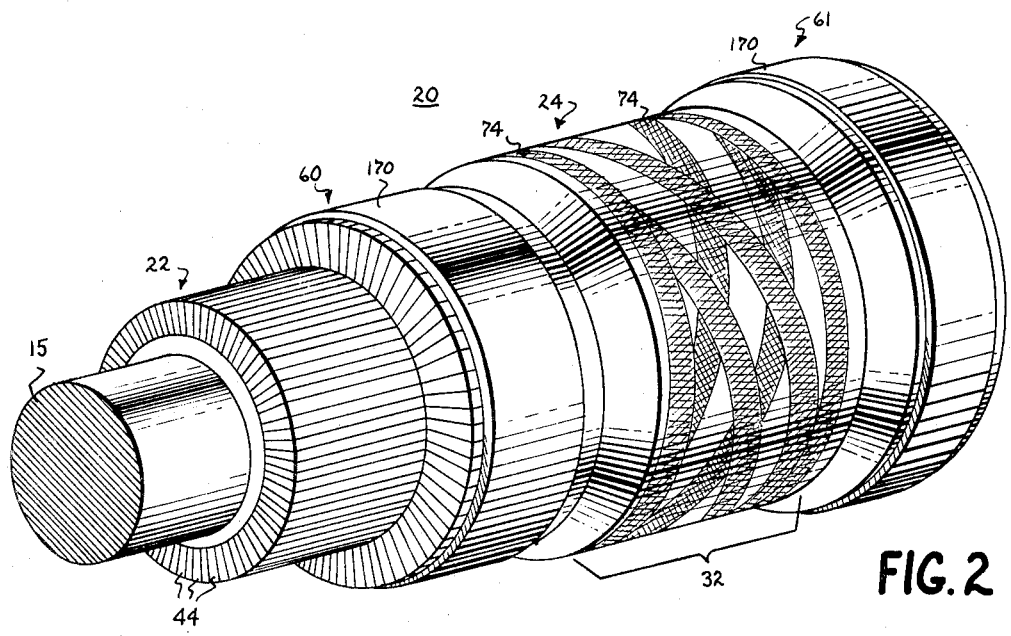
FIGURE 2 is a perspective view of a hollow cylindrical armature in accordance with this invention.
Figure 3:
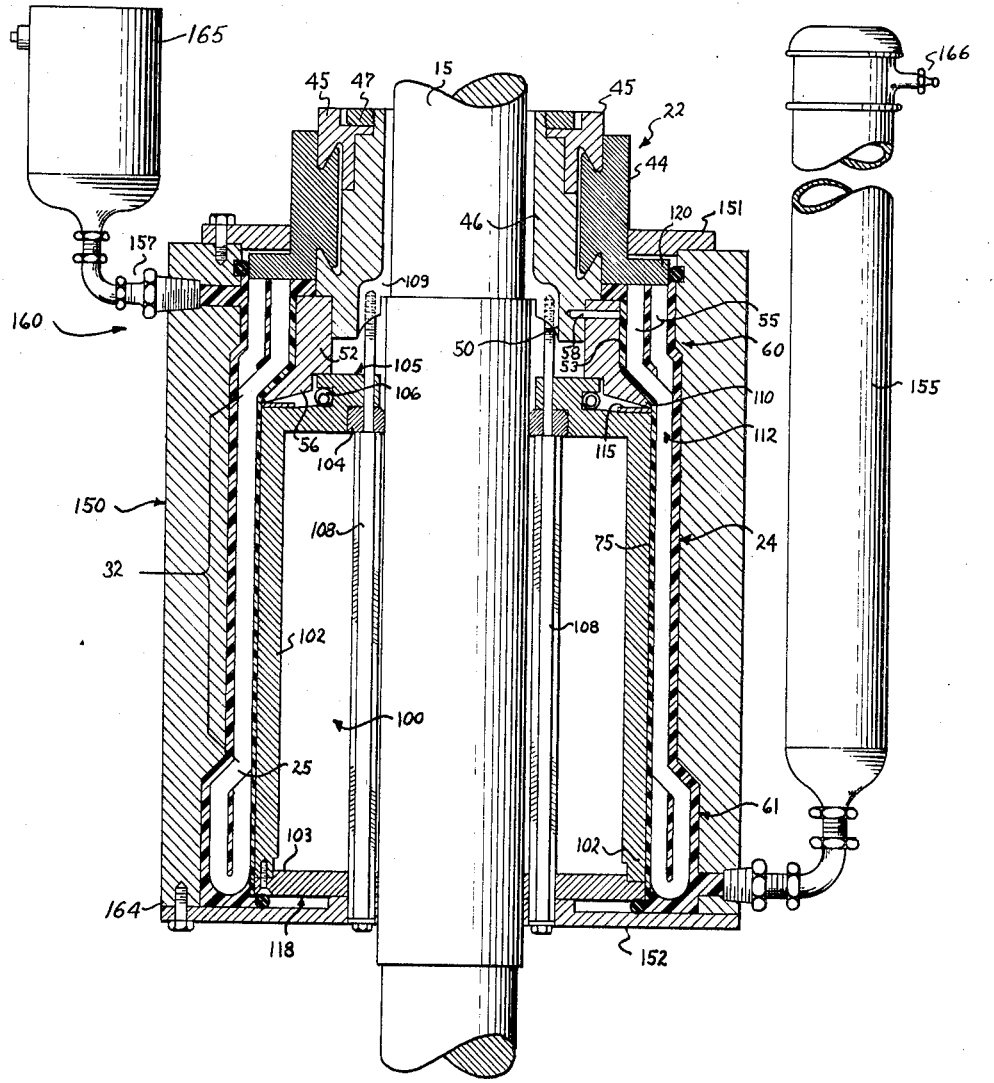
FIGURE 3 is a composite vertical sectional view illustrating details of the hollow cylindrical armature of this invention together with apparatus useful in the construction of such an armature.

The details of construction of the novel shell-type armature of this invention may best be understood by reference to FIGURES 2 and 3. As shown, the armature 20 includes the commutator 22 and the hollow cylindrical inductor structure 24 which contains the armature winding 25. Commutator 22 may be of any suitable construction and is shown as comprising commutator segments 44 held together, to provide the well-known arch-bound type of commutator assembly, by the V-rings 45 and 46 which engage the commutator segments 44 and are held together in clamping engagement by the nut 47.

The end 50 of V-ring 46 is provided with an annular extension member 52 which provides a bonding and supporting shoulder 53 for the end portions 55 of armature winding 25. Member 52 includes the angled portion 56 to provide a more continuous support for end portions 55 as well as a greater area for bonding such portions to the commutator. It is this strong, intimate bond between the extension member 52 and the ends 55 which serves to couple winding 25 to the commutator and through the commutator to the shaft. This bond, therefore, must be sufficiently strong to withstand the high torsional stresses.

Annular member 52 may be integral with the V-ring 46 or it may be a separate member of a lightweight material, such as aluminum, which is suitably secured to the end 50 such as by an appropriate interference fit. To assure a sufficiently strong connection between member 52 and the end 50 of V-ring 46, one or more pins 58 may also be employed.

The outside contour of annular extension member 52 is provided with a coating of a suitable electrically insulating material, such as an epoxy resin composition applied, for example, by the well-known "fluid-bed" technique. The hollow cylindrical inductor shell 24 has one end thereof intimately bonded to the outside contour of member 52 to provide a hollow shell in the form of a mass of hardened resin containing armature winding 25, cantilevered from the commutator 22 for rotation therewith.

The hollow cylindrical inductor structor 24 is made up of a rigid, homogeneous mass of hardened resin containing the armature winding 25 therein. Armature winding 25 is made up of a plurality of armature coils appropriately preformed, as shown in detail in FIGURES 5 and 6, to provide a drum-type winding contained within the mass of hardened resin. Armature winding 25 has the usual overlapping end regions 60 and 61 at the ends adjacent to and remote from commutator 22 respectively, however, all the "active" or coil side portions 32 of the armature winding are disposed in side-by-side relationship and on the same radius with respect to the longitudinal axis of rotation of the structure 24. More simply, this may be stated in another way as an armature winding having the usual overlapping end regions 60 and 61 and with the portions of the coils 32 between such end regions disposed in side-by-side relationship. This winding arrangement, therefore, differs from the conventional drum-type winding wherein both the end regions 60 and 61 as well as the coil side portions, that is the portions between such end regions, are displaced radially one above the other. For example, whereas in a conventional drum-type armature winding one coil side lies in the bottom of a core slot and the other coil side lies in the top of a core slot displaced a desired number of electrical degrees therefrom, in the present invention the coil sides of the armature winding 25 all lie on the same radius. That is, in side-by-side relation rather than radially displaced top-to-bottom relation. This novel side-by-side relationship of coil sides on the same radius with respect to the longitudinal axis of rotation of the hollow inductor structure 24 may be observed more clearly in FIGURE 4 which illustrates a greatly enlarged sectional view of the portion designated A in FIGURE 1.

It will be readily apparent that since only a single layer of coil sides in side-by-side relationship extend within the air gap 30, such gap may be of minimum size. This may be seen more clearly in FIGURE 1, for example, wherein the overlapping end region 61 of the hollow inductor structure 24 takes up much more space radially than does the coil edge portion 32. Thus, although in general, armature winding 25 may be of any conventional drum-type, the coils thereof must be suitably formed so that while allowing for the required overlapping at the ends thereof, to form the complete armature winding, all the coil side portions are disposed on a common radius. That is, the air gap portion of each armature coil of the winding is on the same radius about the longitudinal axis of rotation of the hollow inductor structor 24. Since a shell-type armature machine inherently requires a larger air gap than does a machine of the conventional construction, a higher machine excitation is also required. Any reduction in the size of the air gap, therefore, means a reduction in the excitation required and thus a reduction in both the size and the weight of the machine. Accordingly, in addition to contributing to the mechanical strength of the hollow cylindrical inductor structure, the single layer of coil sides allows for a minimum air gap as well.

Figure 5:
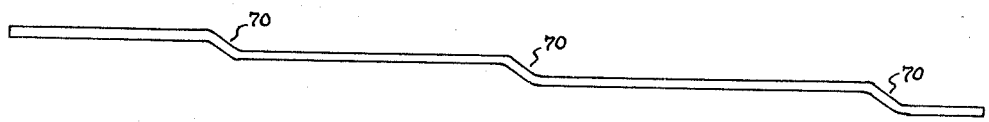
FIGURE 5 is a side elevation of a conductor prior to its formation into an armature coil.
Figure 6:
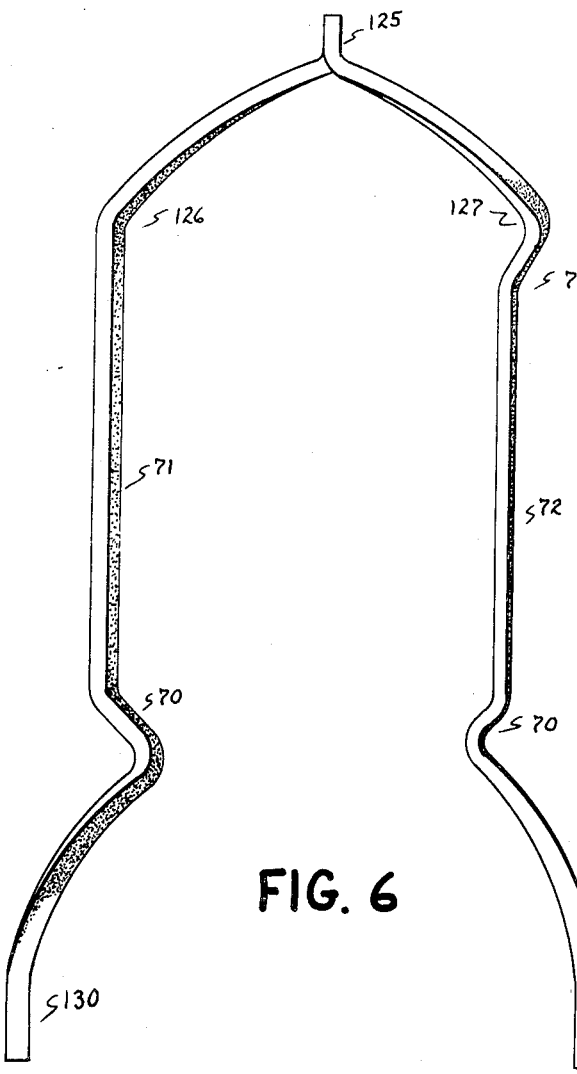
FIGURE 6 is a perspective view of a U-shaped armature coil having end portions and two coil side portions which lie on the same circular arc.

This armature construction is made possible by forming similarly directed off-sets, identified as 70 in FIGURES 5 and 6, in the conductors forming the armature coils so that when thereafter formed into coils of generally loop form in the usual manner the coil side portions 71 and 72 thereof are spaced apart the desired amount and lie on the same circular arc. Thus, the off-sets 70 permit each conductor to cross adjacent conductors so that a complete armature winding may be formed. For example, the level of every conductor is dropped below the level of the air gap at end region 60 and the level of every alternate conductor is raised above the level of the air gap at the end region 61. The armature winding formed with such preformed coils is then encapsulated with an electrically insulating thermosetting resin composition to form the rigid, self-supporting structure 24.

For purposes of illustration and explanation the conductor and coil, shown in FIGURES 4 and 5 respectively, are provided with three off-set regions 70. While it is believed that for most constructions at least two such off-sets will be required, the number employed will be determined by such factors as the desired armature diameter and the relative size of the commutator employed as well as the length of the commutator risers. For any given construction, therefore, the number of similarly directed off-sets employed will be the number required to assure that the coil edge portions of the formed coil lie on the same circular arc.

It will be readily apparent that any suitable form of resin composition may be employed in carrying out such encapsulation. Moreover, such encapsulation may be provided in any suitable manner such as by the use of external molds which are removed to reveal the final product, dipping in a thixotropic composition or the like, so long as all spaces of the winding are filled with the resin composition and it is encased within a protective envelope thereof so as to provide a rigid, hollow structure having a predetermined inside and outside contour.

Preferably, an epoxy liquid-type casing resin is employed with an external mold as described in detail hereinafter and may be a composition which hardens under the influence of heat or one which does not require direct application of heat. The use of an external mold is preferred since it provides a means of providing smooth concentric inner and outer armature surfaces as well as a shell of highly reproducible thickness. Many other well-known resin materials are suitable among which are polyester resins, phenolic resins, silicone resins and the like. A specific example of a suitable epoxy resin composition comprises an epoxy resin, such as Araldite #6005 sold by the Ciba Products Company and $BF_3$-400 as a catalyst. With the fore-going epoxy resin composition, curing at 150° C. for from 4 to 8 hrs. was found to produce a satisfactory product.

To assure that the hollow inductor structure 24, made up of the armature winding 25 encapsulated within a rigid, homogeneous mass of hardened resin, is capable of withstanding the torsional and centrifugal forces encountered, at least one reinforcing annular band 74 of nonconducting material is applied about the outer peripheral surface of the coil edge portion 32 as illustrated more clearly in FIGURE 2. Preferably, a plurality of such annular reinforcing bands are employed each of which may be made up of a plurality of successive layers, or a plurality of overlapping convolutions, of roving formed of a fibrous material impregnated with a thermosetting resinous composition and cured to form a rigid supporting structure. For example, such a band is bonded into a rigid, dense, homogeneous mass by the hardened resin. Preferably, the impregnated roving material is of the type disclosed and claimed in U.S. Patent No. 2,747,118 Almy D. Coggeshall et al.

Although the annular bands 74 are shown in FIGURE 2 as being applied about the outer peripheral surface of the resin encapsulated hollow inductor structure 24, it will be understood that such reinforcing bands could be applied, if desired, about the outer peripheral surface of the armature winding 25 prior to its encapsulating by the thermosetting resinous material. Moreover, such reinforcing bands may be applied in any suitable arrangement such as a random, spiral or helical arrangement rather than concentrically. Further resistance to torsional stresses may be provided by applying at least one layer 75 of a nonconducting material, such as a resin impregnated glass cloth, about the inside contour of the armature winding. When such material is bonded into a dense, rigid, homogeneous mass by the hardened resin the resistance of the structure to torsional stresses is greatly increased. Further, such material aids in assuring a strong intimate bond between the winding structure and the annular extension member 52 attached to commutator 22.

In accordance with another aspect of this invention we provide a method of making the foregoing described novel shell-type armature. In carrying out this method, in one form, a collapsible cylindrical fixture member, shown at 100 of FIGURE 3, is provided about which a plurality of preformed armature coils are arranged to form the desired drum-type armature winding. As shown, fixture member 100 comprises four sector members 102, centering rings 103 and 104, a collapsible support 105, having a garter spring 106 associated therewith, and a plurality of bolts 108 extending through the fixture member. The purpose of the garter spring 106 is to collapse the commutator end of cylindrical fixture member 100 after the inner and outer centering rings 103 and 104 respectively have been removed following the encapsulation step as well be described in further detail hereinafter. The outside diameter of the fixture member 100 is provided to correspond to the desired inside diameter of the armture.

In making an armature in accordance with the method of this invention, the four sector members 102, together with the centering rings 103 and 104, collapsible support 105 and garter spring 106 are secured to the shell 109 of a commutator assembly 22 by the bolts 108 as illustrated in FIGURE 3. The annular extension member 52 is thus arranged so that the outside contour 110 of the angled portion 56 is adjacent the outside contour of the end 112 of fixture member 100 and substantially corresponds thereto. The gap between the end 112 of fixture member 100 and the end of annular portion 56 is closed by a suitable gasket 115 to seal this space and prevent the entrance of the encapsulating resin as will become apparent hereinafter.

After assembling the commutator assembly to the fixture member 100 as described, several wraps of stainless steel sheet, about .005 inch in thickness, are applied over the outer contour of the fixture 100 and secured thereto with pressure sensitive tape. The steel sheet is employed to seal all openings in the circumferential surface of fixtur member 100 and prevent leakage of resin when the winding is later encapsulated. Two wraps of bias-cut glass cloth, impregnated with a thermosetting resinous composition and partially cured, are applied full width over the foregoing described stainless steel wrapper from the end 118 of fixture member 100 to a point near the riser portions 120 of the commutator 22. The resin impregnated glass cloth is employed to provide increased resistance to torsional stresses and the bias-cut full width arrangement provides for such resistance in both directions of rotation of the winding. The portion of the glass cloth which extends over the surface of annular extension member 52 is suitably cut and folded so that the cloth will follow the contour of the support member 52. A thermosetting resin composition, such as an epoxy resin hardener mixture, is applied, as by brushing, to the outer contour of the annular extension member 52 to provide good adherence of the glass cloth to the annular extension member 52.

Conductors are formed, as show in FIGURES 5 and 6, with a number of similarly directed off-sets 70 so that the completed coil, after being provided with a return bend 125 and other bends 126 and 127, is of generally loop form having two coil side portions 71 and 72 spaced apart the required distance yet, because of the similarly directed off-sets 70, such coil sides lie on the same circular arc. A plurality of the coils so formed are then arranged about the outside contuor of fixture member 100 and the free ends 130 and 132 of the coil are connected to appropriate commutator segments to provide the complete drum-type winding. Because of the special forming of the coils, the drum-type armature formed therewith includes end regions 60 and 61 having overlapping coil end portions in the usual manner, however, the coil side portions 32 of such winding are in side-by-side relationship and on a common radius determined by the outside diameter of fixture 100.

Conveniently, a number of preformed coils may be grouped into bundles and saddled over the prepared and insulated outside contour of fixture member 100. At the commutator end 112 of the fixture member 100, the lower end of a given coil is first connected to the appropriate commutator segment, with reference to an appropriate locator such as a shaft keyway for example, and after all such lower ends have been connected the upper ends are also appropriately connected. Suitable electrical insulation strips may be inserted between adjacent elements and between the upper lower end portions of the coils. The coil bundles may be conveniently held in place, while the winding and connecting of coils to appropriate commutator segments takes place, by the use of suitable elastomeric bands or garter springs. Further electrical insulation may be provided between the overlapping portions at the end regions 60 and 61 by inserting therebetween a strip of a suitable electrical insulation, such as asbestos-glass insulating material. The particular insulation system employed is no part of the present invention and is in accordance with well-known conventional arrangements.

The theoretical coil pitch is approximated and the proper number of coil side portions distributed therein so that the coil sides are substantially uniformly distributed around a portion of the outside contour of the fixture member 100. After all coils are so distributed and the ends thereof connected to appropriate commutator segments to provide the desired armature winding, they are bound down to the outside contour of fixture member 100 with annular reinforcing bands 74. The annular bands 74 provide a suitable, rigid, reinforcing structure so that the completed armature will be capable of withstanding the displacement forces encountered during operation. Accordingly, a plurality of successive layers, or overlapping convolutions, of a fibrous material impregnated with a thermosetting resinous composition are applied about the side-by-side coil side portions so that when such material is cured it is bonded into a rigid, dense, homogeneous mass by hardened resin. As described hereinbefore, such material is preferably roving of the type described and claimed in the foregoig referenced Coggeshall et al. Patent No. 2,747,118. If desired, the reinforcing bands 74 need not be applied at this time but may be applied after completion of the encapsulation of the entire winding.

The completed armature winding arranged and bound down to the outer contour of fixture 100 is then encapsulated with a thermosetting resin composition to provide, when cured, a rigid, homogeneous mass of hardened resin containing the armature winding therein.

Such encapsulation may be conveniently provided by placing the fixture member with the armature winding arranged thereabout in a split mold designated as 150 in FIGURE 3. The inside contour of mold 150 corresponds to the desired outside diameter of the armature. Gasketed end plates 151 and 152 are provided and attached to mold 150. Preferably, the entire assembly is then subjected to an elevated temperature preheating the mold to assure free flow of the resin to be introduced thereto. Conveniently, the assembly may be heated to a temperature of about 150° C. prior to the introduction of resin.

Mold 150 is provided with a vertical supply pipe 155 and a venting port 157 arranged so that with the end 160 of the mold elevated, resin introduced into the mold through supply pipe 155 will flow into the mold chamber from the lower end 164 thereof filling all voids and forcing air up and out through the vent port 157. A suitable liquid casting resin, such as an epoxy-hardener composition, is then introduced into mold 150 through supply pipe 155 and sufficient resin supplied to partially fill the reservoir 165 connected to vent port 157. This assures that mold 150 is completely filled. Conveniently, the resin may be first introduced into supply pipe 155 and air pressure applied to the nipple 166 to force the resin into the mold.

The temperature of the assembly is then increased to effect the desired cure of the resin. For the foregoing described epoxy resin mixture, the assembly may be held at a temperature of about 150° C. for about six hours after which the assembly is allowed to cool. The encapsulated armature winding, and the fixture member 100 about which it is disposed, are then removed from mold 150 and nonmagnetic, tinned steel wire bands identified at 170 in FIGURES 1 and 2 are applied at the end regions 60 and 61 of the armature to provide for dynamic balancing in well-known manner. The fixture member 100 is then collapsed and removed from the resin encapsulated armature winding to reveal the completed hollow cylindrical armature 20. This is accomplished by removing the bolts 108 which releases the commutator assembly and allows centering rings 103 and 104 to be removed and also allows garter spring 106 to collapse support 105 adjacent the commutator 22. The four sector members 102 are then readily removed. Since the outside diameter of the fixture member 100 corresponded to the desired inside diameter of the armature and the inside contour of the mold 150 corresponded to the desired outside diameter thereof, the completed armature is a mass of hardened resin containing the armature winding therein and having a preselected inside and outside contour.

Figure 7:
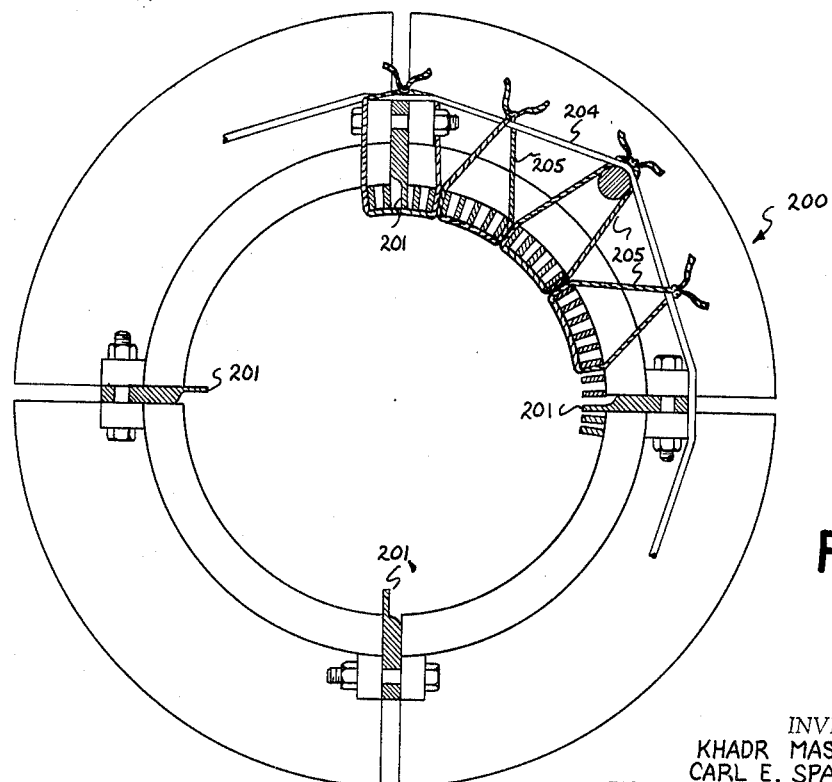
FIGURE 7 is a vertical sectional view of a hollow cylindrical winding fixture useful in the construction of the armatures of this invention.

In FIGURE 7 there is shown, in schematic form, a hollow cylindrical fixture member 200 which may be employed to aid in arranging the armature coils to form the completed armature winding in accordance with another aspect of this invention. The fixture member 200 is provided in a number of sections and includes spacer blades 201 which extend into the inside of the fixture so as to divide the inside contour thereof into four quadrants. Thus, fixture member 200 provides an external winding form in which the armature coils may be contained and properly spaced while the winding progresses to completion.

In carrying out the method in accordance with this aspect of the invention, therefore, armature coils are formed as previously described and shown in FIGURES 5 and 6 to provide generally loop coils wherein the coil side portions are on the same circular arc. A uniform number of such coils is gathered into bundles and placed within winding fixture member 200 and temporarily secured therein such as by tying to a girth wire 204 disposed above an open circumferential slot of the fixture member 200. Conveniently, about 5 to 10 coils may be provided in each bundle, and preferably a number corresponding to a factor of the total number of coils of the winding. The coils of the bundle are then spread out to span over the spacer blades 201 of a given quadrant so that the proper coil pitch and alignment is established after which further ties may be made to girth wire 204 to maintain the distribution. Additional coil bundles are similarly placed, distributed and temporarily secured within fixture member 200 until a complete armature winding is provided with coils substantially uniformly distributed about the inside contour of fixture member 200.

After all coils have been arranged within fixture member 200, fixture member 100, with the outer surface thereof prepared with a covering of resin impregnated glass cloth, as described hereinbefore and with a commutator assembly attached, is inserted within the inside of the winding. The ties 205 holding the coils to the girth wire 204 are then removed releasing the winding from fixture member 200 and allowing such winding to be distributed about the outside contour of fixture member 100. The fixture member 200 is then dismantled and removed so that the winding is distributed about the outside contour of fixture member 100 and connections may then be made to the appropriate commutator segments as previously described. The winding is then reinforced with annular bands 74 and encapsulated with a thermosetting resin composition in the manner described in detail hereinbefore to provide the completed thin, hollow cylindrical, self-supporting armature structure made up of a rigid, homogeneous mass of hardened resin encasing a drum-type armature winding.

The reduction in weight and improvement in the dynamic operating characteristics of a direct current machine incorporating the novel armature of this invention makes possible electric motors of acceptable size and weight to meet the requirements of many high performance servo drive applications. Specifically, shell-type direct current motors constructed in accordance with this invention exhibit electrical time constants much lower than those of machines of conventional construction. For example, whereas the electrical time constant of a 20 horsepower General Electric, Kinamatic, direct current motor frame No. CD-324 and a 20 horsepower General Electric compensated direct current motor frame No. CD-288 exhibited electrical time constants of 0.0187 and 0.0179 second, respectively, a 20 horsepower shell-type machine constructed in accordance with this invention exhibited an electrical time constant of only 0.0029 second.

While only certain preferred embodiments of the present invention have been shown by way of illustration, many modifications and changes will occur to those skilled in the art. It is to be understood, therefore, that the appended claims are intended to cover all such modifications and changes as fall within the true spirit and scope of the invention.

What we claim as new and desire to secure by Letters Patent of the United States is:

1. The method of making a shell-type armature for a dynamoelectric machine which comprises:
   (a) providing a cylindrical member having an outside diameter corresponding to the desired inside diameter of said armature;
   (b) removably securing a commutator assembly to one end of said cylindrical member;
   (c) wrapping the outside contour of said cylindrical member with at least one layer of a sheet material composed of non-conductive fibers impregnated with a partially cured resinous material which forms when cured a dense, homogeneous mass;
   (d) applying a coating of a thermosetting resinous material over the outside contour of the sheet material covering said cylindrical member;
   (e) arranging a plurality of armature coils about the outside of said impregnated sheet material wrapped on the outside contour of said cylindrical member to form a drum-type winding having all coil sides disposed in side-by-side relationship and adjacent the outside contour of said wrapped cylindrical member;
   (f) wrapping the coil sides so arranged with at least one annular band of material composed of a roving of non-conductive fibers concentrically arranged in successive layers to maintain said coil sides in contact with the outer wrapped contour of said cylindrical member and provide for restraining said winding against the effects of torsional and centrifugal forces encountered during operation of said dynamoelectric machine;
   (g) connecting said coils to appropriate segments of said commutator assembly;
   (h) placing said wrapped cylindrical member and the entire winding thereon into a mold the inside contour of which corresponds to the desired outside contour of said armature;
   (i) introducing a liquid casting resin into said mold to completely enclose said winding and fill all spaces therebetween;
   (j) curing said resin to bond said winding into a rigid, homogeneous mass of hardened resin;
   (k) removing said cylindrical fixture member with resin cast winding thereon from said mold;
   (l) and removing said cylindrical member from said resin cast winding.

2. The method of making a shell-type armature for a dynamoelectric machine which comprises:
   (a) providing a cylindrical member having an outside diameter corresponding to the desired inside diameter of said armature;
   (b) wrapping the outside contour of said cylindrical member with at least one layer of a sheet material composed of non-conductive fibers impregnated with a partially cured resinous material which forms when cured a dense, homogeneous mass;
   (c) applying a coating of a thermosetting resinous material over the outside contour of the sheet material covering said cylindrical member;
   (d) arranging a plurality of armature coils about the outside of said impregnated sheet material wrapped on the outside contour of a cylindrical member to form a drum-type winding having all coil sides disposed in side-by-side relationship and adjacent the outside wrapped contour of said cylindrical member;
   (e) wrapping the coil sides so arranged with at least one annular band of material composed of a roving of non-conductive fibers concentrically arranged in successive layers and impregnated with a material which bonds said layers into a rigid, homogeneous mass by a hardened resin;
   (f) placing said wrapped cylindrical member with said armature winding arranged thereon in a mold the inside contour of which corresponds to the desired outside diameter of said shell-type armature;

(g) filling said mold with a liquid casting resin to enclose said complete winding and fill all spaces therebetween;

(h) curing said resin to bond said winding into a rigid, dense homogeneous mass of hardened resin containing said winding;

(i) and removing said cylindrical member from said hardened resin mass to provide a rigid, self-supporting hollow cylindrical inductor structure having a predetermined inside and outside diameter.

3. The method of making a shell-type armature for a dynamoelectric machine which comprises:

(a) forming conductors with a number of similarly directed off-sets intermediate the ends so that when formed into armature coils of generally loop form such coils have two spaced-apart coil side portions which lie in the same circular arc;

(b) arranging a plurality of such preformed coils substantially uniformly about the inside diameter of a hollow cylindrical fixture and temporarily retaining them therein to form a hollow drum-type winding having overlapping end portions but with all coil side portions arranged in side-by-side relationship within said fixture.

(c) inserting a cylindrical fixture member within the hollow armature winding which member has an outside diameter corresponding to the desired inside diameter of said armature;

(d) releasing said winding from said hollow cylindrical fixture and removing said fixture so that said winding is arranged about the outside contour of said cylindrical member;

(e) applying at least one annular band of nonconducting material about the coil side region of said winding to provide reinforcement therefor against the effects of torsional and centrifugal forces and bind said winding to the outside contour of said cylindrical member;

(f) encapsulating the winding assembly so formed with an electrically insulating thermosetting resinous material filling all spaces between said winding and surrounding same with concentric envelopes to provide a rigid, homogeneous mass of hardened resin containing said winding;

(g) and removing said cylindrical member to provide a hollow cylindrical inductor structure having a predetermined inside and outside diameter.

4. The method of making a shell-type armature for a dynamo-electric machine which comprises:

(a) providing a commutator assembly having an annular shoulder extending angularly outwardly from one end thereof;

(b) removably securing a cylindrical fixture member having an outside diameter corresponding to the desired inside diameter of said armature to the end of said commutator assembly having said annular shoulder extending therefrom so that the outside contour of one end of said cylindrical fixture member is adjacent to and corresponds with the outside contour of said annular shoulder;

(c) wrapping the outside contour of said cylindrical fixture member with at least one layer of a sheet material composed of non-conductive fibers impregnated with a partially cured resinous material which forms when cured a dense, homogeneous mass;

(d) applying a coating of a thermosetting resinous material over the outside contour of said annular shoulder and the sheet material covering said cylindrical fixture member;

(e) forming conductors with a plurality of similarly directed off-sets at predetermined locations intermediate the ends so that when formed into armature coils of generally loop form the two spaced-apart coil side portions thereof lie in the same plane and terminate in free ends;

(f) arranging a plurality of such preformed armature coils about the outside contour of said cylindrical fixture member with said free ends directed toward said commutator and connecting said free ends to appropriate commutator segments to form a drum-type armature winding having overlapping end portions but with all coil side portions disposed in side-by-side relationship and on a common radius determined by the outside diameter of said cylindrical fixture member;

(g) applying at least one annular band over the coil side portions of said winding, said band being composed of non-conductive fibers arranged in successive layers and adapted to be bonded into a rigid, dense homogeneous mass by a hardened resin;

(h) encapsulating the winding so formed about said cylindrical fixture member with a thermosetting, electrically insulating resinous material filling all spaces between the coils of said winding and forming a rigid, homogeneous mass of hardened resin containing said armature winding therein;

(i) and removing said cylindrical fixture member from said commutator assembly and said encapsulated winding secured thereto to reveal a hollow cylindrical inductor structure having predetermined inside and outside diameters with said commutator assembly intimately bonded thereto.

References Cited

UNITED STATES PATENTS

| | | | |
|---|---|---|---|
| 2,361,842 | 10/1944 | Heintz et al. | 29—598 X |
| 2,759,116 | 8/1956 | Glass | 310—171 |
| 2,860,267 | 11/1958 | Hayes | 310—266 |
| 3,102,964 | 9/1963 | Bennett et al. | 310—266 X |
| 3,212,170 | 10/1965 | Marshall | 310—43 X |
| 3,242,358 | 3/1966 | Balke et al. | 310—43 X |
| 3,312,847 | 4/1967 | Waclaw | 29—598 X |

JOHN F. CAMPBELL, Primary Examiner

C. E. HALL, Assistant Examiner

U.S. Cl. X.R.

264—272; 310—42, 43, 266